Feb. 6, 1934.  C. D. COLLINS  1,946,275
FLUID MEASURING APPARATUS
Filed Sept. 17, 1928   2 Sheets-Sheet 1
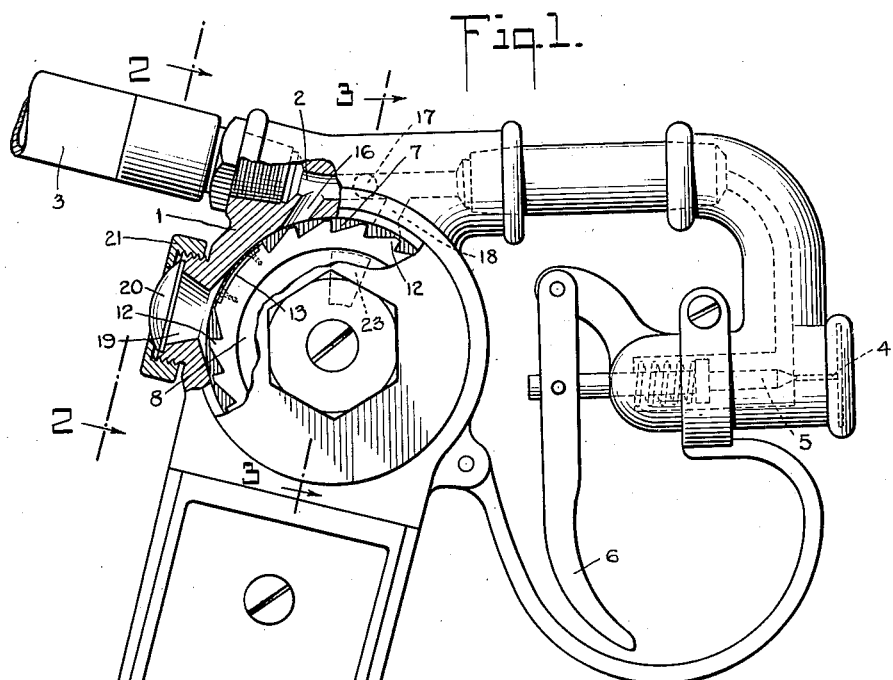
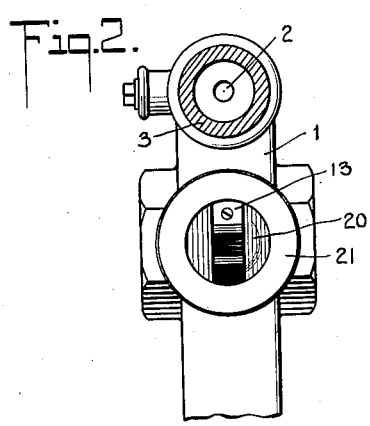
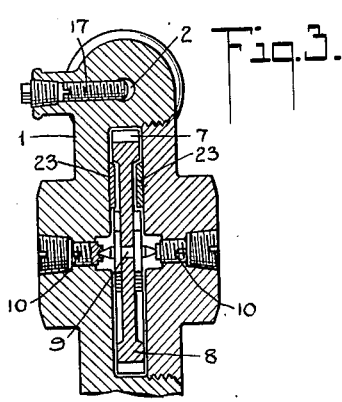
INVENTOR
Charles D. Collins
BY
ATTORNEY Feb. 6, 1934.   C. D. COLLINS   1,946,275
FLUID MEASURING APPARATUS
Filed Sept. 17, 1928   2 Sheets-Sheet 2
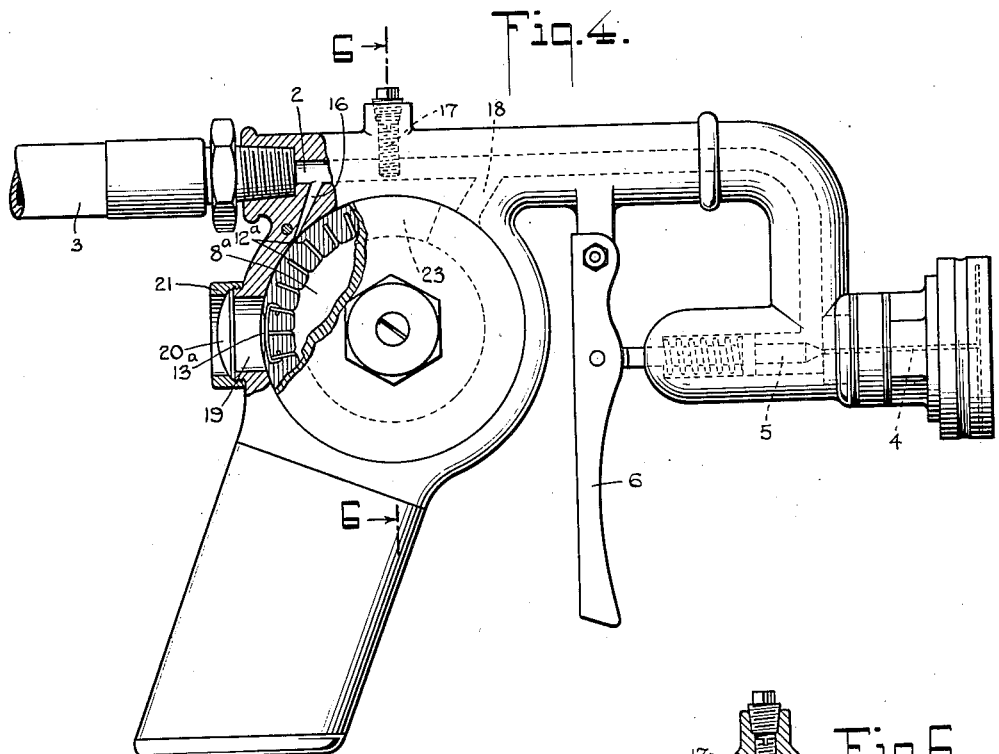
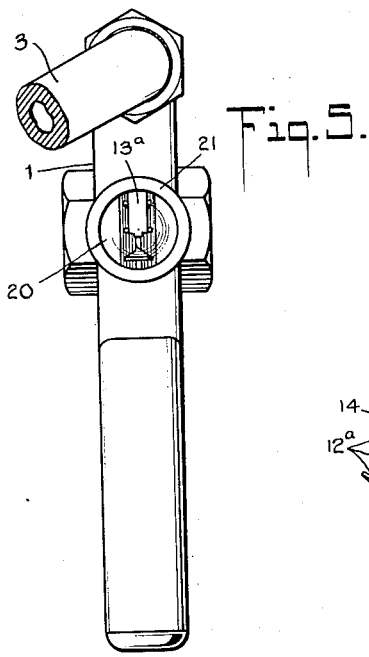
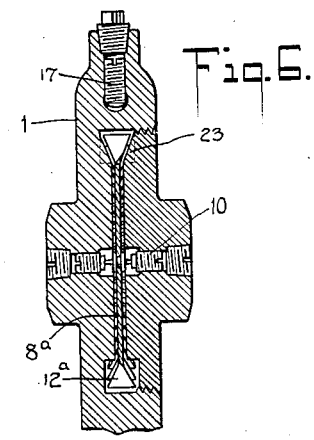
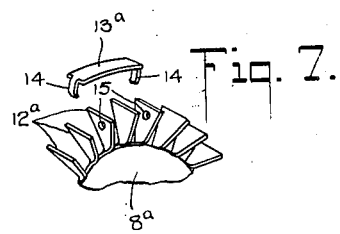
INVENTOR
Charles D. Collins
BY
ATTORNEY Patented Feb. 6, 1934

1,946,275

UNITED STATES PATENT OFFICE 1,946,275

FLUID MEASURING APPARATUS

Charles D. Collins, New York, N. Y., assignor to American Cyanamid Company, New York, N. Y., a corporation of Maine Application September 17, 1928
Serial No. 306,481

3 Claims. (Cl. 73—37)

This invention relates to a measuring apparatus for fluids, either in the form of a liquid, a gas, or a powder suspended in a gaseous menstruum.

The principal objects of the invention are to provide a portable, light device of the character described, as a convenient gun or like apparatus, which will visibly indicate to the operator the quantity of fluid passing therethrough and discharged therefrom, and to provide a comparatively simple construction which will have but one moving part and which will produce efficient results.

To this end the invention contemplates a measuring apparatus, which includes a housing, having a duct therethrough, comprising an inlet for the material to be sprayed or ejected and an outlet or discharge orifice. Between the inlet and the discharge orifices, and within the housing, is located an enlarged chamber carrying rotary means for visibly indicating the quantity of material passing through the device. This indicating means may conveniently take the form of a light wheel of aluminum, hard rubber or the like, having vanes on its periphery formed in any desirable manner, the entire wheel being mounted in the housing for rotation. An inlet by-pass is provided allowing communication between the duct and the enlarged chamber, arranged in such a manner that the material flowing through the by-pass impinges upon the vanes of the rotary device and rotates the same.

An outlet by-pass is provided, whereby the diverted material may again reach the duct for discharge. Suitable means are provided whereby the duct may be partially or completely closed off to divert a proper quantity of material through the by-pass.

The rotary device is provided with a suitable target presenting an appreciable amount of a bright or light colored surface to the observer who is enabled to view the same through a lens covered window in the housing.

By suitably adjusting the amount of fluid passing through the by-pass, rotation of the measuring wheel may be calibrated so that each time the target passes the lens or window the operator will know that a given quantity of material has been ejected from the outlet orifice.

The invention further consists in the novel arrangements construction and combination of parts, as hereafter described and shown in the accompanying drawings.

In the drawings,

Fig. 1 is a side elevation partly in section of a device embodying my invention.

Fig. 2 is a fragmentary view along the line 2—2 of Fig. 1.

Fig. 3 is a view along the line 3—3 of Fig. 1.

Fig. 4 is a side elevation partly in section of a modified form of device.

Fig. 5 is a rear view of Fig. 4.

Fig. 6 is a sectional view along the line 6—6 of Fig. 4.

Fig. 7 is a detail of the rotor.

Referring now with particularity to the drawings, I have shown a housing indicated generally by the numeral 1, having a duct 2 therein to which the material to be sprayed is delivered under pressure through the tube 3. This duct passes through the housing and terminates in an outlet orifice 4 controlled in the usual manner by valve 5 operated by a trigger 6.

Within the housing and below the duct 2 is an enlarged chamber 7. A measuring wheel or rotor 8, preferably of hard rubber, sheet aluminum or like light suitable material is mounted for rotation in the chamber 7 upon the axle 9 held between adjustable bearing pins 10, carried by the housing 1.

This rotor 8 is provided with a series of vanes 12 at its periphery.

Target 13 attached to the rotor 8, is provided, having a flat surface which may be either chromium plated or painted a light color so as to be entirely visible to the operator.

The by-pass passage 16 connects the duct 2 with the enlarged chamber 7 and the passage of material from the duct to the chamber is controlled by the adjusting screw 17, so arranged that suitable rotation thereof may partially or completely block the duct 2 to divert a part or all of the material from the duct into the chamber. By-pass 16 is so located as to direct a substantially tangential stream of fluid against the vanes 12 which causes rotation of the wheel 8. An outlet by-pass 18 permits the fluid to find its way back to the duct 2 and be ejected through the orifice 4.

Opposing dams 23 are provided, in each side of the enlarged chamber to prevent the fluid escaping from by-pass passage 16 directly to the passage 18 without rotating the wheel. These dams form an obstruction in the path of the moving material, thus causing it to move around the wheel as desired.

The housing is provided with a window 19, covered by a lens 20, held in place by the bezel 21, so that the operator by looking through the lens may view the target 13 as it passes the window upon rotation of the wheel 8 under impulse of the flowing fluid.

It will be apparent that by the use of this device or a similar construction, I am able to so calibrate and adjust the rotation of the wheel 8 that the operator by watching the movement of the target past the window, will know the quantity of material passing through the device in any given period. This is a very desirable factor in the use of some fumigants such as hydrocyanic acid or the like.

Obviously the device is adapted for many uses and materials and the invention is not to be limited to the use of either a liquid, gaseous or solid spraying material.

The modified form of device has a somewhat similar construction, the essential difference being in the construction of the rotor.

In this case the rotor is shown at 8a which consists of an aluminum or other light metal member having its periphery slitted and the metal between slits twisted at right angles to the main body to provide fins or vanes 12a. The target 13a is provided with fingers 14 which engage the fins 12 in apertures 15 so as to retain the same in place. The operation of the device is the same as in the preferred form.

I claim:

1. A measuring apparatus comprising a windowed housing having a duct therein, an enlarged chamber connected with the duct, rotor means within the chamber indicating through the window the flow of material passing through the device and moved by direct contact with the flowing material, and means for closing off the duct to divert a portion of the flowing material through the chamber, said housing having an exit port for said diverted material, said port communicating with said duct.

2. A measuring device comprising a housing, having a duct therein including an inlet and a discharge orifice, a rotor in the housing and movable under physical impact of the material flowing through the device, vanes on the rotor and a target secured to the rotor, a window in the housing, said target presenting a bright surface to the window, whereby revolutions of the rotor may be counted.

3. A measuring device comprising a housing, having a duct therein having an inlet and an outlet, means between the inlet and the outlet for restricting the size of the duct, said housing having a by-pass passage connected with the duct on each side of the restricting means, said by-pass passage having an enlarged portion, rotary means therein adapted to be rotated by contact with material flowing through the by-pass passage, a target on the rotary means, a window in the housing, said target being visible through the window upon rotation of the rotary means.

CHARLES D. COLLINS.